United States Patent [19]
Deerfield

[11] 3,725,649
[45] Apr. 3, 1973

[54] FLOATING POINT NUMBER PROCESSOR FOR A DIGITAL COMPUTER

[75] Inventor: Alan J. Deerfield, Newtonville, Mass.

[73] Assignee: Raytheon Company, Lexington, Mass.

[22] Filed: Oct. 1, 1971

[21] Appl. No.: 185,498

[52] U.S. Cl. .................................235/156, 235/160
[51] Int. Cl. ............................G06f 7/39, G06f 7/385
[58] Field of Search ...............235/156, 159, 160, 164

[56] References Cited

UNITED STATES PATENTS

| | | | |
|---|---|---|---|
| 3,193,669 | 7/1965 | Voltin | 235/164 |
| 3,056,550 | 10/1962 | Horrell | 235/164 |
| 3,434,114 | 3/1969 | Arulpragasam et al. | 235/164 X |
| 3,304,417 | 2/1967 | Hertz | 235/156 X |
| 3,536,903 | 10/1970 | Goshorn et al. | 235/156 X |

*Primary Examiner*—Malcolm A. Morrison
*Assistant Examiner*—James F. Gottman
*Attorney*—Philip J. McFarland

[57] ABSTRACT

A processor for digital numbers, specifically a multiplier using a "floating point" technique, is disclosed. The disclosed processor is adapted to determine the product of two unnormalized digital numbers, each one of such numbers being expressed as a mantissa and a signed exponent of a selected base, and to express such product as a mantissa with the greatest possible degree of significance and a signed exponent of the base. The processor is operative simultaneously to determine the sum of the exponents and the partial products of the mantissas of the numbers being processed and to normalize one of such mantissas, adjusting the sum of the exponents correspondingly. Means are also provided to stop the multiplication process as soon as all significant partial products are determined.

3 Claims, 2 Drawing Figures

FLOATING POINT NUMBER PROCESSOR FOR A DIGITAL COMPUTER

The invention herein described was made in the course of or under a contract or subcontract thereunder, with the Department of Defense.

BACKGROUND OF THE INVENTION

This invention pertains generally to digital computers and particularly digital computers in which floating point numbers are processed.

It is known in the art that the so-called "floating point" technique may be used in digital computers so that the significant portion of any number corresponding to a "floating point" number may be preserved without requiring the length of essential elements, such as registers, to be any greater than necessary. A "floating point" number is a number which is represented by a sign, a value termed the "mantissa" and a signed exponent of the base of the digital numbers being processed. Thus, any particular digital number may be expressed as $\pm M \times r^{\pm n}$ where "M" is the mantissa, $r$ is the base and $\pm n$ is the exponent. The floating point is presumed to appear before the left-most significant digit of the mantissa and the exponent is changed, if necessary, so that the value of the floating point number is the same as the value of the particular digital number to which it corresponds. The floating point number is considered to be "normalized" if its mantissa contains the maximum possible amount of significance. In other words, a normalized floating point number has a value other than "zero" as the left-most significant digit in its mantissa. The normalization process for any floating point digital number involves the steps of shifting the floating point to its proper position in the mantissa and changing the exponent so that the value of the combination of mantissa and exponent remains constant.

It is well known in the art that the floating point technique may be applied whenever digital numbers are to be added, subtracted, multiplied or divided. In the situation in which addition or subtraction is to be effected, unnormalized floating point numbers with different exponents may be processed by changing the exponents of the digital numbers to be processed until such exponents are the same and shifting the mantissas with respect to each other a corresponding amount (to maintain the values of the two numbers) and then adding, or subtracting if desired, the adjusted mantissas. The resulting sum, or difference, of the adjusted mantissas, when combined with the adjusted exponent, is the desired sum, or difference, if none of the significant digits in the original mantissas are lost. The resulting unnormalized sum, or difference, is then normalized in order to allow any further processing, as multiplication or division, to be performed.

When it is desired to multiply digital numbers using floating point techniques, a normalization is required. Because any known multiplication process involves the accumulation of partial products obtained from a digit by digit multiplication of two digital numbers (a multiplicand and a multiplier) the number of digits in the product equals the sum of the digits in the multi-plier and the multiplicand. In the usual case the number of digits in the two is the same so the number of digits in the product is twice that of either the multiplier or the multiplicand. The low order half, i.e. the least significant half, of the product does not add to the accuracy of the multiplication process and, further, may not be used without adding undue complexity to the computer. It follows then that, if multiplication is to be properly effected, the product must be normalized before further processing to be sure that the highest degree of significance is retained.

In the past, normalization has been accomplished in the multiplication process by either: (a) normalizing the product after multiplication has been completed; or, (b) by using only normalized numbers of the multiplier and the multiplicand. The former approach requires shifting of the product number in its accumulator after the multiplication process is finished, a process which is time consuming and which does not allow the exponent of the product to be checked until after the process is complete. The latter approach requires that both the multiplicand and the multiplier be normalized before the multiplication process may be started. Such normalization again involves a time consuming shifting process which is usually done after previous processing steps such as addition or subtraction. If the length of time required for normalization must be reduced to a minimum, it is necessary that additional circuitry be supplied to detect the amount of shifting required to normalize the mantissa of the floating point number to be normalized and then to shift the mantissa and adjust the exponent. It is evident that such additional circuitry adds to complexity and should if possible be eliminated.

SUMMARY OF THE INVENTION

With this background of the invention in mind it is an object of this invention to provide an improved technique for deriving a normalized product when multiplying two unnormalized floating point digital numbers.

A further object of this invention is to provide an improved technique to derive a normalized product as a result of multiplication of two unnormalized floating point digital numbers without requiring shifting of the mantissa of the product or unnecessary adjustment of its exponent.

Still another object of this invention is to provide method and apparatus for the multiplication of two unnormalized floating point digital numbers which completes the multiplication process whenever all digital zeroes are in the mantissa of the number which is the multiplier.

Still another object of this invention is to provide method and apparatus for multiplication of two floating point digital numbers which contain provisions for detecting, at the earliest possible moment, when the product is larger than the greatest digital number which may be processed.

These and other objects of this invention are attained generally when two floating point numbers are to be multiplied by subdividing the numbers into their "exponent" and "mantissa" portions; summing the two exponent portions and subtracting from such sum a number which corresponds to the number of digits in the mantissa of the number taken as the multiplier of two numbers; normalizing the mantissa of the number taken as the multiplicand while determining the partial products, digit by digit, of the multiplicand and the multiplier, and incrementing the modified sum of the exponents after the multiplicand is normalized until the multiplier becomes zero or the required number of iterations have been completed.

BRIEF DESCRIPTION OF THE DRAWINGS

For a more complete understanding of this invention reference is now made to the accompanying description of a preferred embodiment illustrated in the drawings in which.

DESCRIPTION OF THE PREFERRED EMBODIMENTS

Figures 1, 2:
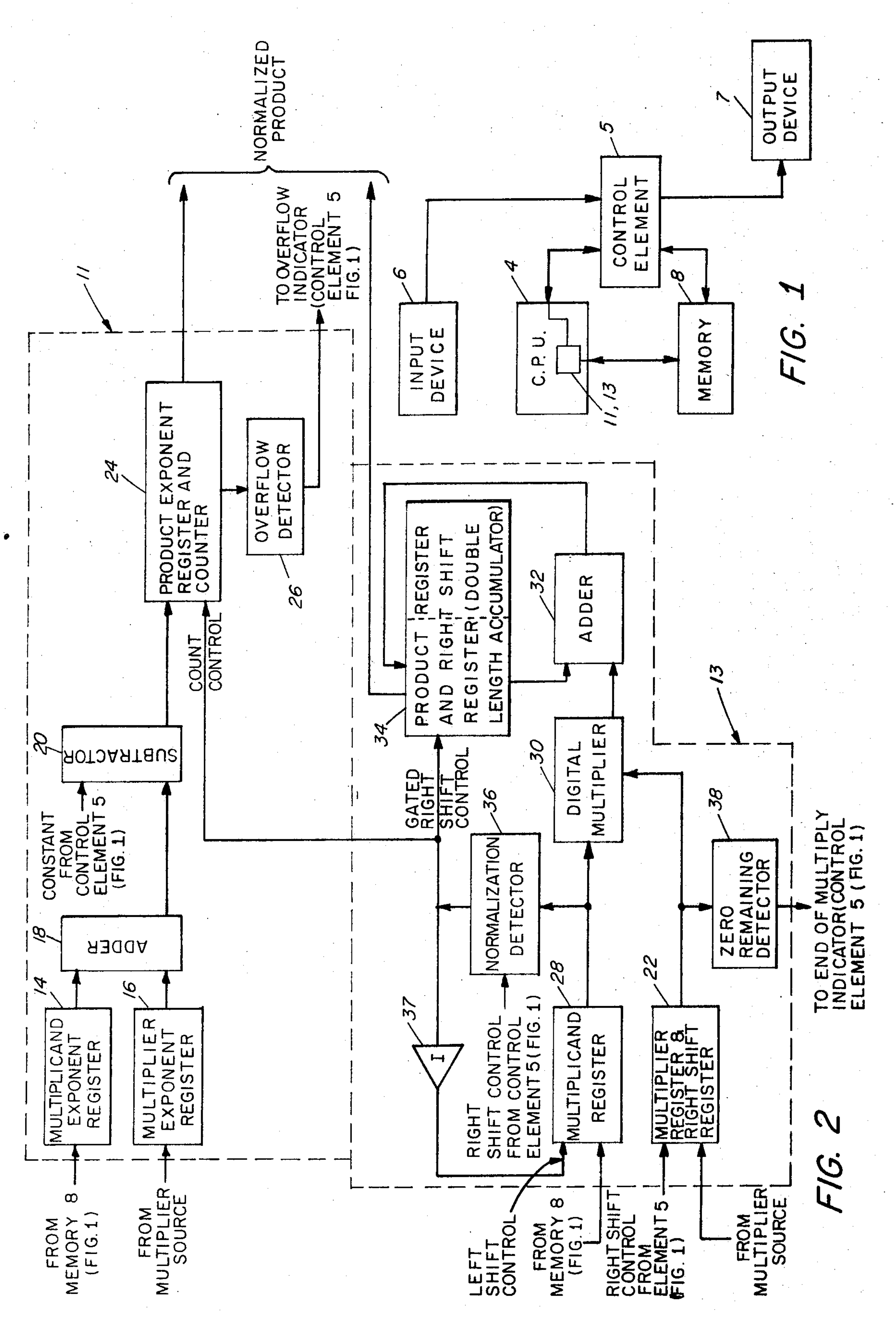
FIG. 1 is a generalized block diagram of a digital computer, such diagram indicating the relationship of a floating point multiplier according to the invention to the remaining portion of such computer
FIG. 2 is a block diagram showing the arrangement of the elements and the manner in which such elements are controlled according to the invention.

Referring first to FIG. 1 it may be seen that the floating point multiplier herein contemplated is disposed in the central processing unit (CPU 4) of a digital computer. Such a computer is conventional, having control element 5, an input device 6, an output device 7 and a memory 8. To execute any particular program the input device 6 is actuated to impress appropriate instruction words on the control element 5. That element, in turn, in response to the address and operation codes in each instruction word, actuates the CPU 4 and the memory 8 to perform the operations required. On completion of the processing, the result is passed from either the CPU 4 or the memory 8 back through the control element to the output device 7. The floating point multiplier contemplated by this invention is located in the CPU 4 along with other types of arithmetic units not shown.

Referring now to FIG. 2, it may be seen that the preferred embodiment of this invention includes an exponent processing portion 11 and a mantissa portion 13 which when taken together produce a floating point digital number indicative of the product of two unnormalized digital numbers. Thus the exponent processing portion 11 includes a conventional multiplicand exponent register 14, the number and arrangement of the stages therein being adapted to store the largest possible exponent of the multiplicand. Such register receives the particular exponent of the multiplicand from a memory 8 (FIG. 1) in a conventional manner. Similarly, a multiplier exponent register 16 is disposed within the exponent processing portion 11. The exponents stored in the multiplicand exponent register 14 and the exponent stored in the multiplier exponent register 16 are passed to an adder 18, thereby to produce at the output thereof a digital number equal to the sum of the exponents of the two registers. Such sum is impressed on one input terminal of a subtractor 20. The second input of the latter is a digital number equal to the maximum number of digits in a multiplier register 22 (which register is contained in the mantissa processor 13). The difference between the digital numbers into the subtractor 20 then is passed to a product exponent register 24. It follows then that initially, the latter register contains a digital number which is representative of the exponent of the product of the multiplicand and the smallest possible multiplier to be processed. To complete the exponent processing portion 11, an overflow detector 26 is connected to the product exponent register 24. Such detector is a conventional logical matrix which produces a signal when all stages in the product exponent register 24 are filled.

Turning now to the mantissa processor 13, it may be seen that that assembly includes, in addition to the multiplier register 22, a multiplicand register 28. The mantissa of the multiplicand is, initially, loaded in the multiplicand register 28 from memory 8. (FIG. 1). The outputs of the multiplicand register 28 and the multiplier register 22 are connected to a multiplier 30 arranged to derive partial products, digit by digit in a conventional manner, of the two digital numbers in the two registers. Such partial products are fed, through a summer 32, to an accumulator 34 so that each partial product is added to the sum of the previously derived partial products as shown. Also in circuit with the multiplicand register 28 is a normalization detector 36. Such a detector may, for example, be a simple logic circuit which gates clock pulses from the control element 5 (FIG. 1) to the "right shift control" of the accumulator 34 and gates clock pulses over the count control line to the product exponent register and counter 24 when the first digit, other than a zero, in the multiplicand is positioned in the most significant stage of the multiplicand register 28 and which permits clock pulses to be applied through an inverter 37 to the "left shift control" of the multiplicand register 28 when such condition does not exist. To complete the mantissa processor 13, a zero remaining detector 38 is connected to the multiplier register. Such detector may typically be a matrix of AND gates which produces an "operation complete" indication when all stages of the multiplier register 22 are zeroes. In operation, the exponent and mantissa of the multiplier (which values are usually derived from the accumulator) are applied respectively to the multiplier exponent register 16 and the multiplier register 22 through any convenient means (not shown). At the same time the exponent and the mantissa of the multiplicand are applied respectively to the multiplicand exponent register 14 and the multiplicand register 28. The exponents then are added, the sum thereof being reduced the number of stages in the multiplier register 22, and applied to the product exponent register 24. With any two given exponents, then, the number in the product exponent register 24 is the smallest possible number. Assuming that the number in the multiplicand register 28 contains zeroes in its first "N" most significant stages, the normalization detector 36 then passes N left shift control clock pulses to the multiplicand register 28. The result of such a left shift is that the most significant digit in the multiplicand is in the most significant stage of the multiplicand register 28.

It should be noted that partial products of the unnormalized numbers in the multiplicand register 28 and the multiplier register 22 are produced by the digital multiplier 30 during this phase of operation. Such partial products are applied, through the summer 32, to the accumulator 34. Because the multiplicand, in the process of being normalized, is shifted the partial products in the accumulator 34, although not shifted, here grow left. The normalization detector 36 therefore changes its condition to inhibit the left shift clock pulses from the multiplicand register 28 and to enable right shift control to the accumulator 34. At the same time the normalization detector 36 enables an "ADD ONE" count control signal to be applied to the product exponent register 24. It may be seen therefore that, once the multiplicand has been shifted in the multiplicand register 28 as just described, further partial products are successively derived. Such partial products are then applied through the summer 32 to the accumulator 34. During this part of the process right shift control clock pulses are applied to the accumulator 34. Thus, the partial product in the accumulator grows right when the multiplicand is normalized. In other words, a normalized mantissa is formed in the accumulator 34. It follows then that after each partial product is derived, the digits in the multiplier register 22 are shifted to the next stage therein, the partial products are shifted right by one stage in the accumulator 34 and a ONE is added to the number in the product exponent register 24. In the ordinary situation, when the zero remaining detector 38 indicates that all stages of the multiplier register 22 are zero, the multiplication process is complete and all shift control clock pulses are inhibited. The number in the product register 34 then equals the product of the mantissas of the two numbers to be multiplied. Such product is normalized (except, of course, when, during normalization of the multiplicand, the multiplier register 22 is emptied). In any event, however, the significant digits in the product are located in the upper half of the accumulator 34 so that significance of such product is retained. The number in the product exponent register 24 then equals the exponent of the product. Taken together, therefore, the numbers in the product register 34 and the product exponent register 24 represent the desired product with the greatest possible amount of significance. It will be noted that the overflow detector 26 may, at any time during the multiplication process, indicate that the number in the product exponent register 24 is greater than the highest exponent that the computer may process. In other words, during the multiplication process the product of the two numbers to be multiplied may be larger than the greatest number that the computer may process. When such condition exists the multiplication process cannot be continued without error. Therefore, if at any time the overflow detector indicates that the capacity of the computer has been exceeded a signal is presented by means not shown to the operator of the computer and any further operations of the computer are inhibited. It is also possible during the multiplication process that the overflow detector 26 indicates that the sum of the exponents of the numbers being multiplied is smaller than the smallest exponent which may be processed. When such a condition obtains the digits in the significant stages of the product register 34 are zeroes. In other words, the situation may exist in which the product of the two numbers to be multiplied approaches zero. The overflow detector 26 in such a case indicates to the operator that the multiplication process has produced an indeterminant result which may or may not be true. Depending upon the particular program being carried out the operator may then cause the program to be aborted or to continue using an arbitrary zero as the result of the multiplication process. While the invention has been shown and described with particular reference to its application to a floating point multiplier, the inventive concepts may be applied to other types of processes, as floating point dividers. It is evident, for example, that additional means could be provided to generate the reciprocal of the numbers to be loaded into the multiplier exponent register 16 and the multiplier register 22 so that the resulting products would correspond to the quotient of two floating point numbers. Further, the disclosed multiplier could be modified to permit addition or subtraction of two floating point numbers. In such a case the numbers in the multiplicand exponent register 14 and the multiplier exponent register 16 must first be made equal to each other with appropriate shifting of the numbers in the multiplicand register 28 and the multiplier register 22. After such adjustment the numbers then in the multiplicand register 22 would be added or subtracted to obtain the mantissa of the sum or difference of the two numbers and the value of the two numbers. The exponent of the result then is the exponent of either the multiplicand exponent register 14 or the multiplier exponent register 16. It is felt therefore that this invention should not be restricted to its disclosed embodiment but rather should be limited only by the spirit and scope of the appended claims.

What is claimed is:

1. For use in a digital computer, circuitry for determining the product of two floating point numbers, each including a mantissa and an exponent of a base, one of such numbers being a multiplicand and the other one being a multiplier, such circuitry comprising:

a. means for adding the exponents of the multiplicand and the multiplier to determine an initial exponent of the product;

b. means for subtracting a number equal to the maximum number of significant places in the mantissa of the multiplier from the initial exponent to determine an intermediate exponent of the product;

c. a multiplicand register and a multiplier register for receiving, respectively, the mantissa of the multiplicand and the multiplier;

d. means for multiplying, digit by digit, the mantissas in the multiplicand and the multiplier registers to obtain partial products, the sum of selected ones thereof equaling the digits in the mantissa of the product and for simultaneously normalizing the mantissa in the multiplicand register; and e. means, actuated when the mantissa in the multiplicand register is normalized, for incrementing the intermediate exponent and decrementing the partial products as each one thereof is obtained to normalize the product of the two floating point numbers.

2. Circuitry as in claim 1 having, additionally:

a. significant digit detecting means, responsive to the significant digits in the mantissa of the multiplier in the multiplier register, for detecting when the last significant digit in such mantissa has been used to obtain partial products; and b. means, responsive to the significant digit detecting means, for providing a signal indicating that the sum of the partial products obtained prior to such signal contain all the significant digits in the mantissa of the product of the two floating point numbers.

3. Circuitry as in claim 2 having, additionally:

a. means for comparing the intermediate exponent with an upper and a lower limiting number; and, b. means, responsive to such comparison means, for producing a signal whenever the intermediate exponent exceeds either such limiting number.

* * * * *